(12) United States Patent
Friesen

(10) Patent No.: US 6,496,884 B1
(45) Date of Patent: *Dec. 17, 2002

(54) MICROCOMPUTER SYSTEM WITH COLOR CODED COMPONENTS

(75) Inventor: Mark Ben Friesen, Palo Alto, CA (US)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/437,077

(22) Filed: May 5, 1995

(51) Int. Cl.$^7$ .............................................. G06F 13/00
(52) U.S. Cl. ...................................................... 710/100
(58) Field of Search ................................ 439/488, 489, 439/490; 395/281

(56) References Cited

U.S. PATENT DOCUMENTS

| | | | | |
|---|---|---|---|---|
| 4,410,224 A | * | 10/1983 | Giulie ....................... | 339/18 R |
| 4,445,711 A | * | 5/1984 | Cunningham ............... | 283/1 R |
| 4,470,181 A | * | 9/1984 | Sergeant .................... | 29/33 M |
| 4,784,614 A | * | 11/1988 | Sadigh-Behzadi .......... | 439/488 |
| 4,820,193 A | * | 4/1989 | Noorily ...................... | 439/488 |
| 5,037,330 A | * | 8/1991 | Fulponi et al. ............. | 439/607 |
| 5,039,974 A | * | 8/1991 | Schaefer ..................... | 338/163 |
| 5,051,870 A | * | 9/1991 | Companion ................. | 361/405 |
| 5,114,363 A | * | 5/1992 | Mitra ......................... | 439/491 |
| 5,150,246 A | * | 9/1992 | Kimball et al. ............. | 359/118 |
| 5,347,113 A | * | 9/1994 | Reddersen et al. ......... | 235/462 |
| 5,401,193 A | * | 3/1995 | Lo Cicero et al. .......... | 439/713 |
| 5,417,585 A | * | 5/1995 | Morin et al. ................ | 439/488 |
| 5,445,272 A | * | 8/1995 | Crisp ....................... | 206/459.5 |
| 5,470,253 A | * | 11/1995 | Siems et al. ................ | 439/491 |
| 5,487,683 A | * | 1/1996 | Carlson, Jr. ................. | 439/718 |

OTHER PUBLICATIONS

Francis, Bob; "Packard Bell Redesigns PC to be Colorful and Easy to Use", Jun. 22, 1994 One Page.*

* cited by examiner

*Primary Examiner*—David A. Wiley
(74) *Attorney, Agent, or Firm*—Katten Muchin Zavis Rosenman

(57) ABSTRACT

A microcomputer system facilitates the connection of peripheral devices to a computer unit with a plurality of external ports for connecting to external peripheral devices. In one embodiment of the invention, a set of adhesive strips is attached to positions adjacent to the ports. Each strip in the set has a distinct color. Another embodiment of the invention includes an adhesive strip having a plurality of color coded regions, each of the color coded regions being placed adjacent to a separate one of the external ports.

The microcomputer system also contains at least one peripheral device. The device is designed to be electrically matched to one of the ports In one embodiment of the present invention, the peripheral device contains a cable and a plug. The plug has a color which is substantially the same as The strip color associated with the matching port. Thus, a user merely has to match the color of the plug to the color of the strip in order to determine the correct way to connect the peripheral device to the computer unit. Alternately, the cable instead of the plug can be color coded or both the cable and the plug can be color coded. In yet another embodiment of the invention, one or more adhesive strips each also have a commonly used icon, identifying the peripheral device whose plug is designed to connect with the external port, adjacent to which the adhesive strip has been attached.

8 Claims, 4 Drawing Sheets

MICROCOMPUTER SYSTEM WITH COLOR CODED COMPONENTS

BACKGROUND OF THE INVENTION

The present invention relates generally to microcomputer systems, and more particularly to methods and devices for facilitating the connection of peripherals or the like to a microcomputer.

The power of microcomputers has grown drastically since the introduction of first generation microcomputers (such as the Altair 8800). The Altair 8800 was sold to electronic hobbyists in kit form. It had 256 bytes of RAM. Programs were entered into the RAM by entering binary instruction codes using switches. About all that the computer could do was to blink a few lights. It had no keyboard, no external storage device for storing data or program, and no video monitor.

Better computers were soon introduced. All of them had keyboards. They used dumb terminals as display devices. Cassette tapes and floppy diskettes were used as external storage media. Programs could be written in high-level languages such as BASIC and FORTRAN. Operating systems (such as CP/M) were developed for microcomputers. Business oriented programs, such as an electronic spreadsheet called VisiCal, were also introduced.

The microcomputer market took off with the introduction of IBM personal computer and compatible computers (collectively, the "IBM PC"). More than a hundred million IBM PCs had been sold. One of the reasons for the success of the IBM PC is that it is a microcomputer with open architecture, i.e., the technical standard for attached peripheral devices and boards to the IBM PC is in the public domain, thus allowing many vendors to make and sell competing products to owners of the IBM PC. Buyers are more willing to invest in the IBM PC because they will not be locked into products supplied by just one vendor.

As a result of the hugh market and the associated revenues, many companies, including chip, board and peripheral device manufacturers, spent millions of dollars to improve the performance of the IBM PC and related products. Consequently, the IBM PC and peripheral devices became more powerful. At the same time, the price of IBM PCs and peripherals decreased as a result of economy of scale. Soon, microcomputers became useful tools for general purpose usage instead of toys for hobbyists or special instruments used in laboratories.

The first segment of society which bought a large number of IBM PCs was the business segment comprising large and medium size companies. As of today, the business segment still represents a substantial portion of the microcomputer market. The microcomputers are used in these companies to run word processor, spreadsheet, and database software.

As a result of IBM PC's open architecture, it is often necessary to assemble several peripheral devices to a main computer unit in order to build a complete microcomputer system. This assembling process is not easy because many connectors and cables look substantially the same. Consequently, the companies in the above mentioned business segment hire computer professionals, either in-house or outside consultants, to set up and maintain microcomputers.

Currently, the price of an IBM PC is within the reach of many families and small offices. These families buy microcomputers to run education software for children and entertainment software for the whole family. The home computers also allow office workers to take some of their works home. At the same time, many small offices discover that they can save money by using a microcomputer to perform many functions which previously required professional helps, such as accounting. In addition, standard word processor, spreadsheet and database software allow an office to be run more efficiently. Consequently, the home and small office computer market become a very important part of the microcomputer market.

Typically, persons who buy a home or small office IBM PC do not have any training in computer hardware. Some of them even cannot identify the names of the peripheral devices which need to be connected to the main computer unit. However, these buyers cannot afford to hire high-priced consultants to set up the computers for them. The stores which sell them computers cannot afford to send a technician to every home or small office to set up the computers because of the low profit margin in selling computers. Consequently, these buyers encounter a great deal of frustrations in setting up their computers. Thus, there is a need to design microcomputer systems which can be easily set up by these inexperienced buyers.

SUMMARY OF THE INVENTION

The present invention involves a microcomputer system designed to facilitate the connection of peripheral devices to a computer unit. The computer unit has a plurality of ports for connecting to external peripheral devices. In one embodiment of the present invention, a set of adhesive strips is attached to positions adjacent to the ports. Each strip has a distinct color. The present invention also covers other means for providing color coding to the ports, such as painting.

The microcomputer system also contains at least one peripheral device. The device is designed to be electrically matched to one of the ports. In one embodiment of the present invention, the peripheral device contains a cable and a plug. The plug has a color which is substantially the same as the strip associated with the matching port. Thus, a user merely has to match the color of the plug to the color of the strip in order to determine the correct way to connect the peripheral device to the computer unit.

In another embodiment of the present invention, the cable instead of the plug can be color coded. In a further embodiment of the present invention, both the cable and the plug can be color coded.

These and other features of the present invention will become apparent from the following description when read in conjunction with the drawings and the appended claims.

DETAILED DESCRIPTION OF THE PREFERRED EMBODIMENT

Figure 1:
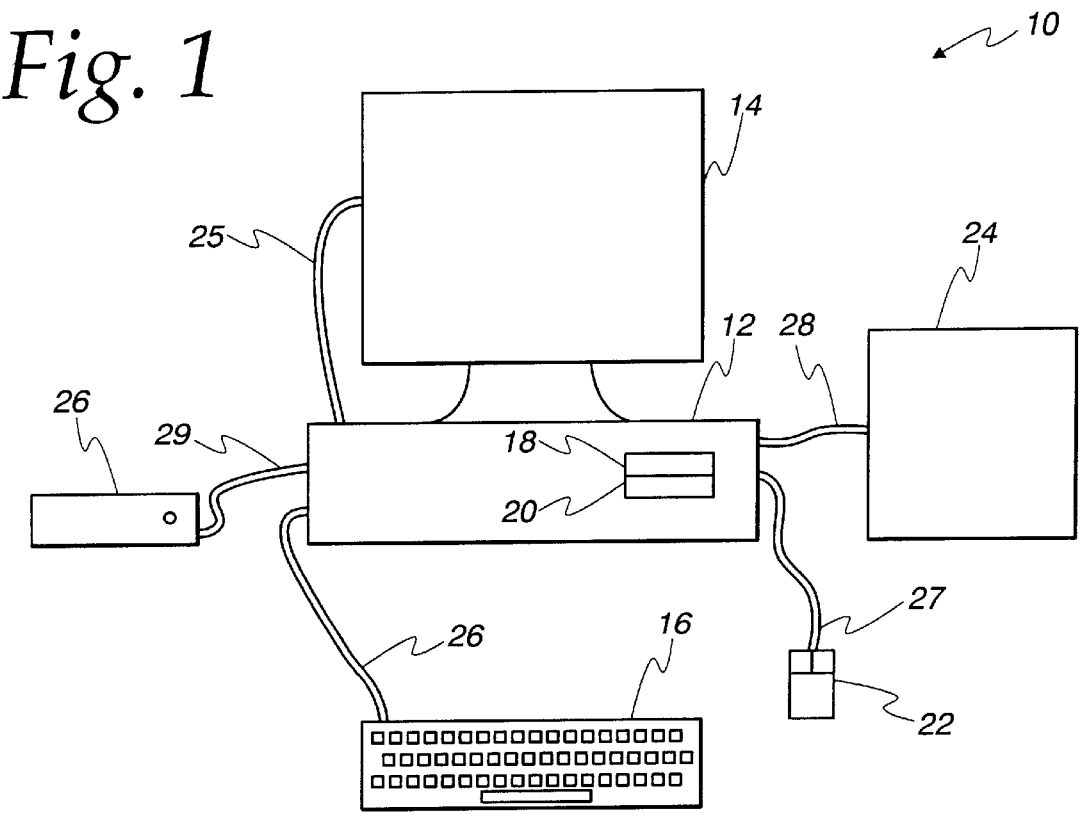
FIG. 1 is a drawing showing a microcomputer system in accordance with the present invention.

FIG. 1 is a drawing showing a microcomputer system 10 in accordance with the present invention. System 10 comprises a computer unit 12. Computer unit 12 preferably contains two or more bays 18 and 20 which could be used to hold a 5¼ inch floppy drive, a 3½ inch floppy drive or other devices such as a CD-ROM reader or tape backup system. System 10 also comprises peripheral devices, such as a video monitor 14, a keyboard 16, a pointing device (e.g., a mouse 22), a printer 24 and a modem 26. Monitor 14, keyboard 16, mouse 22, printer 24, and modem 26 are connected to computer unit 12 through cables 25–29, respectively.

In one embodiment of the present invention, microcomputer system 10 comprises an innovative color coding system. In this system, plugs of the peripheral devices and the corresponding receptacles of computer unit 12 are color coded. This color coding system can be applied to an IBM PC. In this case, all the components in system 10 are prior art components except for the presence of color coding thereon.

Figure 2A:
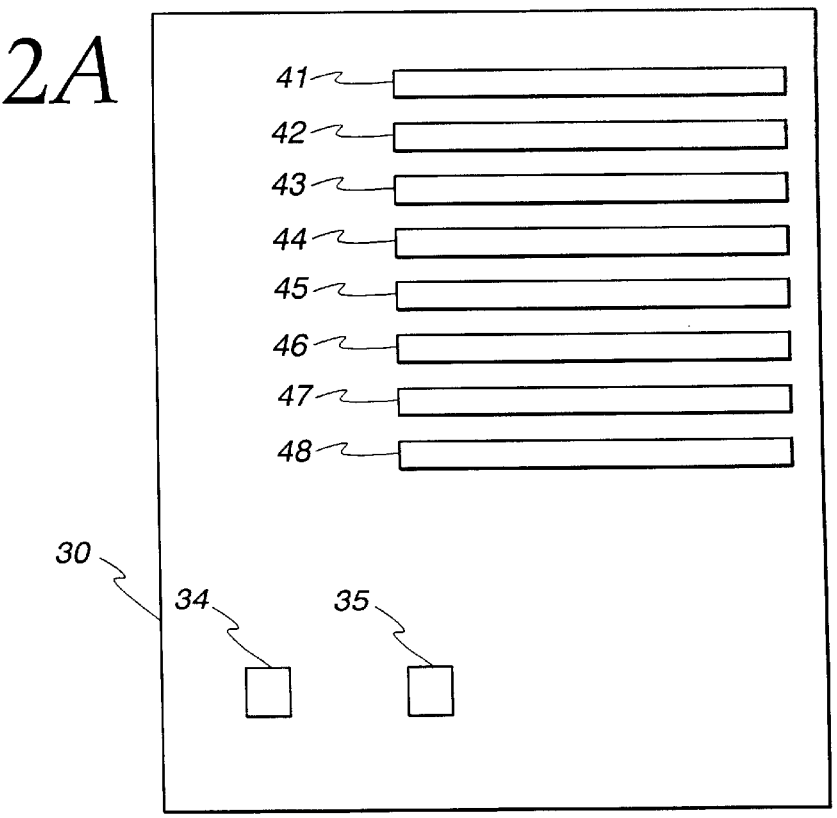
FIG. 2A shows the top view of a motherboard used in a prior art IBM PC.

FIG. 2A is a drawing showing a top view of a motherboard 30 used in an IBM PC. Mother board 30 comprises a variety of integrated circuits, such as a CPU 34 and a cache controller 35. Mother board 30 also comprises a plurality of connectors 41–48 for accepting peripheral boards (shown in FIG. 2B). In an IBM PC, connectors 41–48 are preferably connected to an ISA (Industrial Standard Architecture) bus, a PCI bus, or a VESA local bus.

Figure 2B:
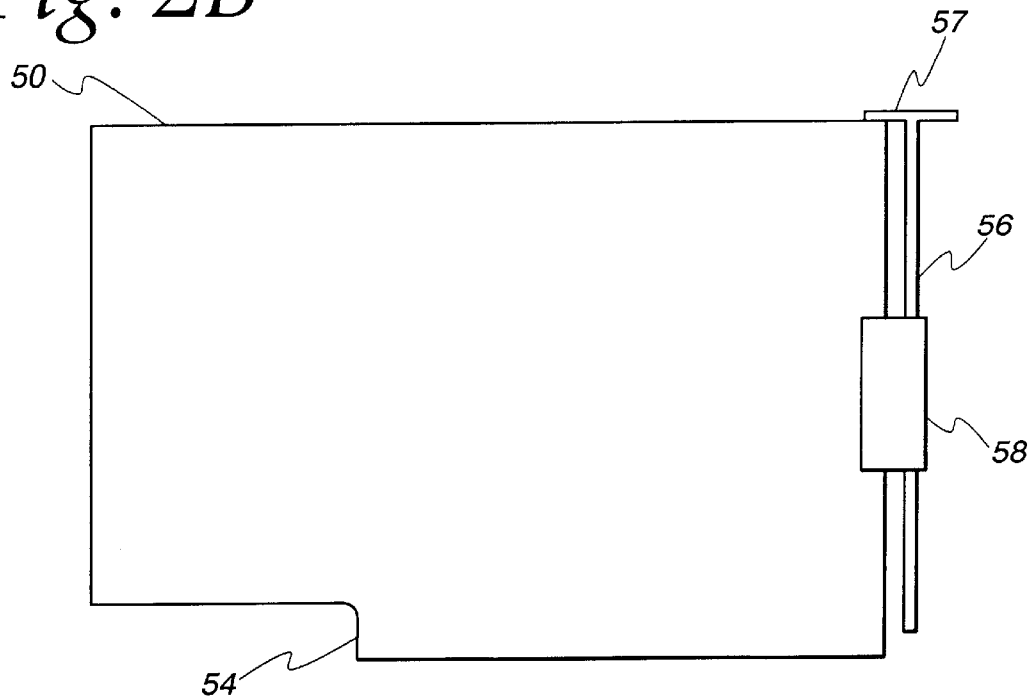
FIG. 2B shows a cross sectional view of a peripheral board used with the motherboard of FIG. 2A.

FIG. 2B is a drawing showing a cross sectional view of a peripheral board 50 used with one of the connectors, such as connector 41. Board 50 comprises an edge 54 for insertion into connector 41. Edge 54 provides electrical connection between mother board 30 and peripheral board 50. Board 50 also includes a metal strip 56 containing a portion 57 for attaching to a chassis of computer unit 12. Board 50 optionally contains a port 58 for providing electrical connection between an external device, such as printer 24 of FIG. 1, to board 50.

Figure 3:
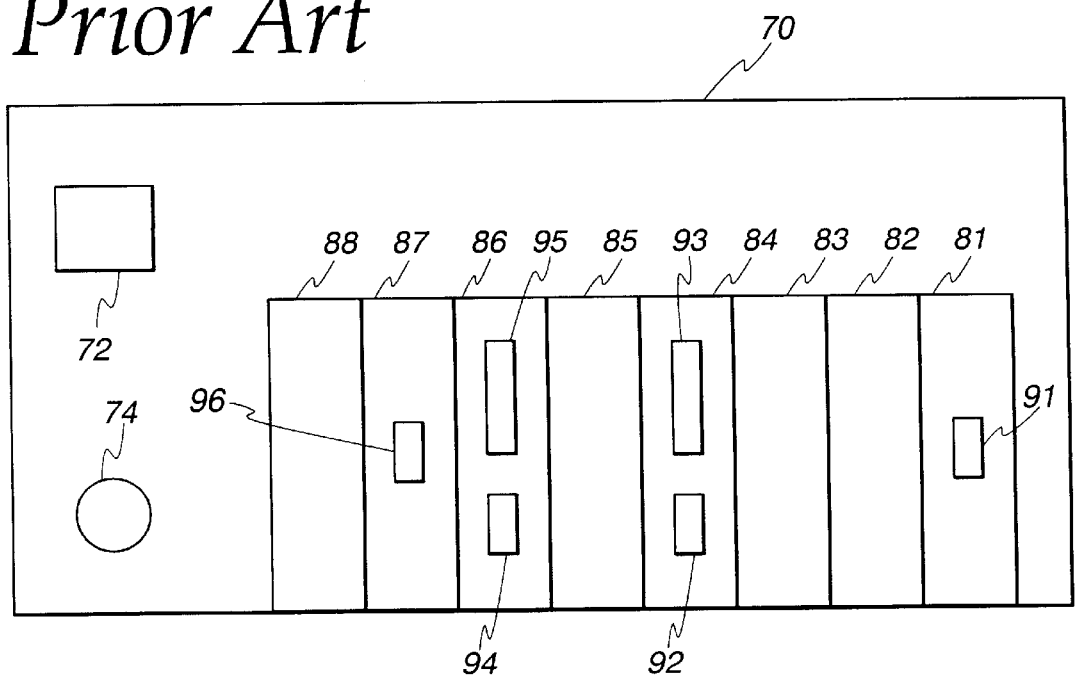
FIG. 3 shows a prior art back panel of a computer unit.

FIG. 3 is a drawing showing the back panel 70 of the chassis of a prior art IBM PC. The IBM PC contains a motherboard, such as board 30 of FIG. 2A. Back panel 70 contains a receptacle 72 for accepting a power cord (not shown) and a port 74 for accepting a keyboard. FIG. 3 also shows a plurality of metal strips 81–88. These metal strips ensure that the IBM PC has a closed metallic enclosure for reducing the amount of electromagnetic interference radiated by electronics components therein to surrounding electronic devices. If no peripheral board is inserted to connectors 41–48, metal strips 81–88 are blank strips. If a peripheral board (e.g., board 50) is inserted into a connector (e.g., connector 41) of motherboard 30, the corresponding blank metal strip needs to be removed so that the metal strip of the peripheral board can take its place. The metal strip of the peripheral device (e.g., strip 56) again ensures that a closed metallic enclosure is maintained.

In FIG. 3, four of the metal strips contains ports, shown as 91–96. If peripheral board 50 is inserted into connector 41 of motherboard 30, port 91 would be the same as port 58 of peripheral board 50. These ports allow external peripheral devices to be electrically connected to the computer.

As microcomputers become more powerful, it is possible to connect a large number of peripheral devices thereto. Thus, the number of ports increases. For example, a microcomputer preferably contains a printer port for connecting to a printer, at least two serial ports for connecting to a modem and other serial devices, a game port for connecting to a joystick, a video port for connecting to a video monitor, and ports for connecting to loudspeakers, local area networks, etc.

As can be seen in FIG. 3, some of these ports have similar or the same physical appearance. For example, both the printer port and the serial port of many IBM PCs use a DB25 connector. The game port and the video port also use DB-type connectors. As a result, it is very difficult for an untrained person to correctly connect appropriate peripherals to the designated ports without spending tremendous amount of time. If the wrong connections are made (e.g., connecting a modem to a printer port), the peripheral and/or computer could be damaged.

One aspect of the present invention involves manufacturing peripheral devices having a color coded plug. The corresponding receptacle located at computer unit 12 has a color strip attached adjacent thereto. The colors of the plug and the strip are substantially the same. The color of the strip at each port is substantially different from the color of the strips at other ports. As a result, it is quite easy for a person to insert the color coded plug into the correct receptacle.

Figure 4A:
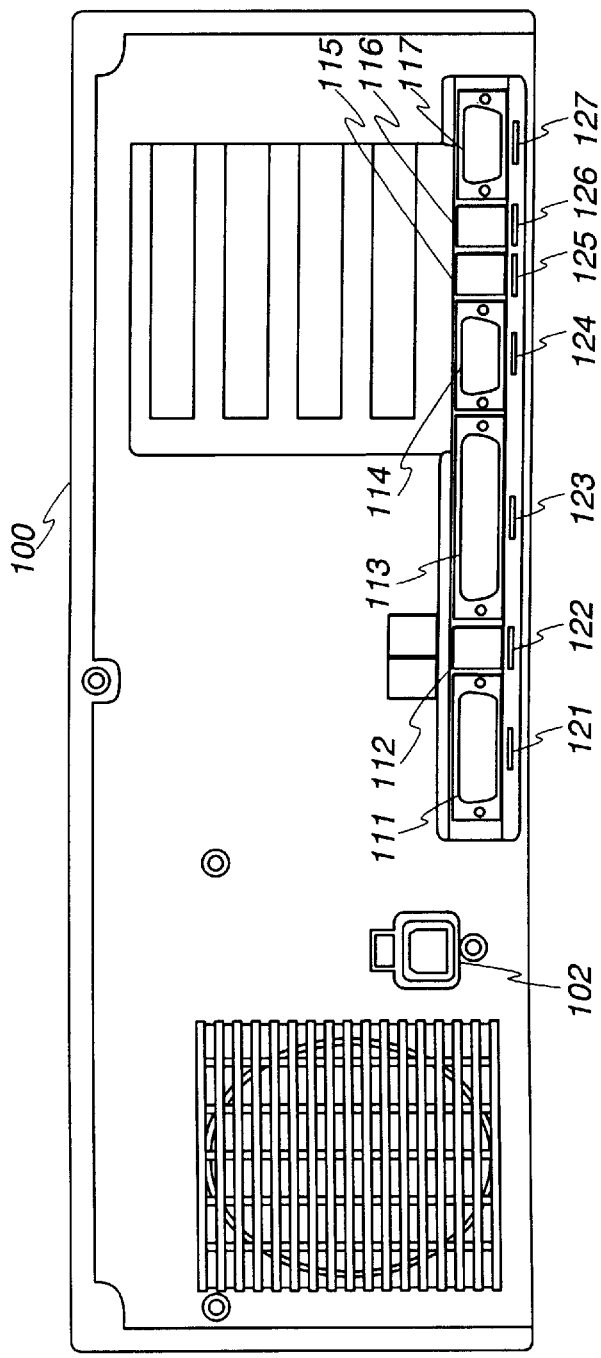
FIG. 4A shows a back panel in accordance with the present invention.

FIG. 4A is a drawing showing a back panel 100 of the chassis of computer unit 12 in accordance with the present invention. Back panel 100 comprises a receptacle 102 for receiving a power cable (not shown). It also comprises a plurality of ports 111–117 for accepting a plurality of peripherals. Not all the ports need to be active at the same time. Below each port is an adhesive strip having a color distinct from the colors of the strips below other ports. In FIG. 4A, these strips are shown as numerals 121–127. It should be appreciated that the locations and number of ports shown in FIG. 4A are for illustrative purposes only, and the invention is not limited to the number and locations shown therein. Further, it is not necessary to provide color coded strips to all the ports.

Figure 4B:
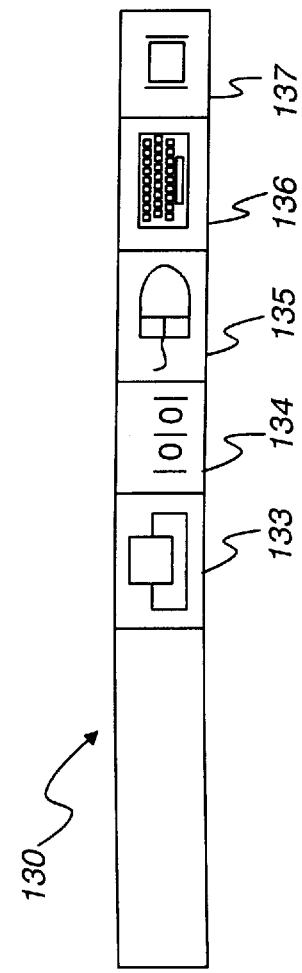
FIG. 4B shows a color coded strip in accordance with the present invention.

In a different embodiment of the present invention, a long adhesive strip having a plurality of color coded regions is attached below ports 111–117. FIG. 4B shows an example of an adhesive strip 130 in accordance with the present invention. Strip 130 contains color coded regions 133–137 which are positioned directly below ports 123–127 of FIG. 4A. The color of each region is distinct. In order to further assist a user to identify the peripherals associated with the ports, each region in strip 130 contains a commonly used icon. For example, the icons in regions 133–137 are associated with a printer, a serial device, a mouse, a keyboard, and a video monitor, respectively.

Computer unit 12 contains a motherboard (not shown) which is electrically similar to motherboard 30 of FIG. 2A. It may also contain peripheral boards which are electrically similar to board 50 of FIG. 2B. Because the locations of the ports on panel 100 of FIG. 4A are different from panel 70 of FIG. 3, the physical shape of the motherboard and peripheral boards used in computer unit 12 may be different from boards 30 and 50 shown in FIGS. 2A and 2B. Because the design of motherboards and peripheral boards are well known in the art, the boards used in computer unit 12 will not be shown here.

Figure 5:
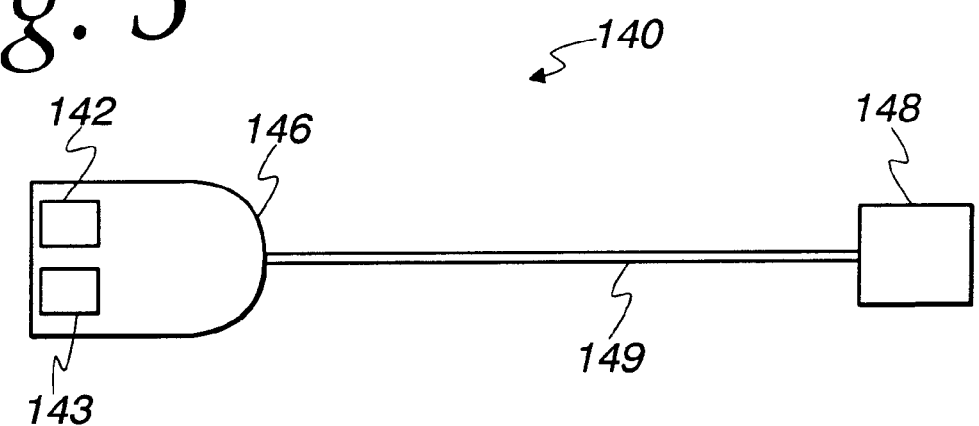
FIG. 5 shows the top view of a mouse in accordance with the present invention.

FIG. 5 is a drawing showing a top view of a mouse 140 in accordance with the present invention. Mouse 140 comprises a pair of buttons 142 and 143 on a housing 146, a plug 148, and a cable 149 connecting housing 146 to plug 148. Plug 148 comprises molded plastic having a color which is substantially the same as the color of the adhesive strip underneath the corresponding mouse port on back panel 100 of FIG. 4A. As a result, it is very easy for a user to associate mouse 140 with the correct port.

In another embodiment of the present invention, cable 149 instead of plug 148 can be color coded. Alternatively, both cable 149 and plug 148 can be color coded.

Figure 6:
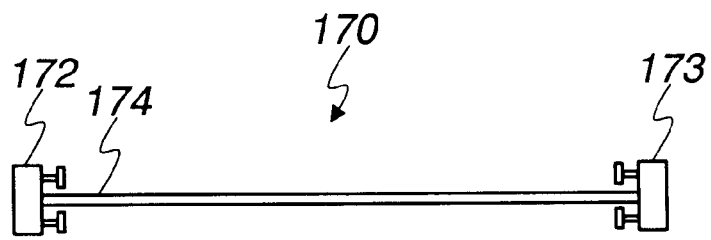
FIG. 6 shows the top view of a VGA extension cable in accordance with the present invention.

As shown in FIG. 5, mouse 140 contains a cable and a plug. There are peripherals which do not contain a cable and a plug. Thus, a cable assembly having both ends securely fastened to separate connectors needs to be used for providing electrical connection between a computer and a peripheral device. One of these connectors is plugged into the computer and the other plugged into the peripheral device. For example, both video monitor 14 and the corresponding video port of computer unit 12 contain a DB15 receptacle. Consequently, a cable assembly needs to be used to connect video monitor 14 to computer unit 12. FIG. 6 shows a VGA extension cord 170 having two DB15 connectors 172 and 173 connected by a cable 174. One of the two connectors 172, 173 is connected to monitor 14 and the other connector is connected to the appropriate video port on computer unit 12. Connectors 172 and 173 and/or cable 174 can be color coded to match the color associated with the video port.

Table 1 shows the color coding associated with the ports of back panel 100 in accordance with the present invention. It should be appreciated that other colors and combinations could be used.

TABLE 1

| Ports | Color | Standard Color No. |
|---|---|---|
| Keyboard | Purple | Pantone 2725C |
| Mouse | Teal | Pantone 321C |
| Monitor | Orange | Pantone 428C |
| Printer | Cool Grey | Pantone 11C |

The adhesive strips 121–127 preferably comprise a 0.10 SA35 G. E. Lexan. The adhesive used is preferably a 3M 468 0.005 pressure sensitive adhesive. The size of the strips is preferably 0.2165×2.720 inches.

Adhesive strips are used because computer unit 12 may have different models, each having a back panel with different port locations. Some of the models may not have sufficient volume to warrant color coding using other means, such as molding. An Adhesive strip provides a relatively low cost color coding material which has satisfactory performance. It should be appreciated that alternative methods for applying color coding, such as painting or molding, could also be used. It should also be appreciated that the strips do not have to be rectangular in shape.

Peripheral devices such as mouses and keyboards are standard devices which can be used with practically all IBM PCs. Thus, color coded peripheral devices can be mass produced. Because the costs for making a conventional plug and a color coded plug are practically the same, the additional cost involved in color coding is practically zero.

In an alternative embodiment of the present invention, the ports of back panel 70 in FIG. 3 can be color coded. In this case, the ports of the peripheral boards need to be color coded.

The invention now being fully described, it will be apparent to one of ordinary skill in the art that any changes and modifications can be made thereto without departing from the spirit or scope of the invention as set forth herein. Accordingly, the present invention is to be limited solely by the scope of the appended claims.

What is claimed is:

1. A microcomputer system designed to facilitate connecting peripheral devices to a computer unit, comprising:

a computer unit having a plurality of external ports for connecting to external peripheral devices;

a set of adhesive strips each having distinct colors, each of said strips being attached adjacent to a separate one of said external ports; and at least one peripheral device having a plug for connecting to a selected one of said external ports, said plug having a color substantially the same as one of said strips associated with said selected external port.

2. The microcomputer system of claim 1 wherein one or more adhesive strips each also have a commonly used icon, identifying the peripheral device whose plug is designed to connect with the external port, adjacent to which the adhesive strip has been attached.

3. A microcomputer system designed to facilitate connecting peripheral devices to a computer unit, comprising:

a computer unit having a plurality of external ports for connecting to external peripheral devices;

a set of adhesive strips each having distinct colors, each of said strips being attached adjacent to a separate one of said external ports;

and at least one peripheral device having a cable and a plug for connecting to a selected one of said external ports, said cable and said plug having a color substantially the same as one of said strips associated with said selected external port.

4. The microcomputer system of claim 3 wherein one or more adhesive strips each also have a commonly used icon, identifying the peripheral device whose plug is designed to connect with the external port, adjacent to which the adhesive strip has been attached.

5. A microcomputer system designed to facilitate connecting peripheral devices to a computer unit, comprising:
- a computer unit having a plurality of external ports for connecting to external peripheral devices;
- a set of adhesive strips each having distinct colors, each of said strips being attached adjacent to a separate one of said external ports;
- and at least one peripheral device having a cable and a plug for connecting to a selected one of said external ports, said cable having a color substantially the same as one of said strips associated with said selected external port.

6. The microcomputer system of claim 5 wherein one or more adhesive strips each also have a commonly used icon, identifying the peripheral device whose plug is designed to connect with the external port, adjacent to which the adhesive strip has been attached.

7. A microcomputer system designed to facilitate connecting peripheral devices to a computer unit, comprising:
- a computer unit having a plurality of external ports for connecting to external peripheral devices;
- an adhesive strip having a plurality of color coded regions, each of said color coded regions being placed adjacent to a separate one of said external ports;
- and at least one peripheral device having a cable and a plug for connecting to a selected one of said external ports, said plug having a color substantially the same as one of the color coded regions associated with said selected external port.

8. The microcomputer system of claim 7 wherein one or more color coded regions each also have a commonly used icon, identifying the peripheral device whose plug is designed to connect with the external port, adjacent to which the color segment has been positioned.

* * * * *